US010311986B2

(12) United States Patent
Hastings et al.

(10) Patent No.: US 10,311,986 B2
(45) Date of Patent: Jun. 4, 2019

(54) INSPECTION APPARATUS AND METHOD OF INSPECTING A REACTOR COMPONENT USING THE SAME

(71) Applicants: Matthew Robert Hastings, Maple Valley, WA (US); Ryan M. Smith, Wilmington, NC (US); Lenin N. Benicki, Port Charlotte, FL (US)

(72) Inventors: Matthew Robert Hastings, Maple Valley, WA (US); Ryan M. Smith, Wilmington, NC (US); Lenin N. Benicki, Port Charlotte, FL (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1256 days.

(21) Appl. No.: 14/155,799

(22) Filed: Jan. 15, 2014

(65) Prior Publication Data

US 2015/0200025 A1 Jul. 16, 2015

(51) Int. Cl.
| | |
|---|---|
| *G21C 17/003* | (2006.01) |
| *G21C 17/007* | (2006.01) |
| *G21C 17/013* | (2006.01) |
| *G21C 19/20* | (2006.01) |
| *G21C 15/25* | (2006.01) |

(52) U.S. Cl.
CPC ......... *G21C 17/003* (2013.01); *G21C 17/007* (2013.01); *G21C 17/013* (2013.01); *G21C 19/207* (2013.01); *G21C 15/25* (2013.01)

(58) Field of Classification Search
CPC .... G21C 17/003; G21C 17/007; G21C 17/01; G21C 17/013; G21C 17/017; G21C 19/20; G21C 19/207; G21C 15/25
See application file for complete search history.

(56) References Cited

U.S. PATENT DOCUMENTS

| 4,169,758 A | 10/1979 | Blackstone et al. |
| 6,076,407 A | 6/2000 | Levesque et al. |
| 6,137,853 A | 10/2000 | Duckering et al. |

(Continued)

FOREIGN PATENT DOCUMENTS

| ES | 2124969 T3 | 2/1999 |
| ES | 2375988 A1 | 3/2012 |

(Continued)

OTHER PUBLICATIONS

Unofficial English Translation of ES Search Report and Written Opinion issued in connection with corresponding ES Application No. 201530037 dated Oct. 13, 2015.

(Continued)

*Primary Examiner* — Sharon M Davis
(74) *Attorney, Agent, or Firm* — Harness, Dickey & Pierce, P.L.C.

(57) ABSTRACT

An inspection apparatus may include an installation platform and a scan head. The scan head may be configured to engage in an index movement, a theta movement, a wrist fold movement, and a scan movement. During the scan movement, a transducer of the scan head travels a circumferential path so as to allow an inspection of a surface that is opposite of a surface on which the installation platform is mounted. The inspection apparatus may be used to inspect a reactor component in a nuclear reactor.

12 Claims, 10 Drawing Sheets

(56) References Cited

U.S. PATENT DOCUMENTS

| | | | |
|---|---|---|---|
| 7,512,207 B2* | 3/2009 | Smith | F04F 5/464 |
| | | | 376/245 |
| 7,769,123 B2 | 8/2010 | Rowell et al. | |
| 8,291,564 B2 | 10/2012 | Jones et al. | |
| 2005/0135904 A1* | 6/2005 | Wivagg | G21C 17/003 |
| | | | 414/222.01 |
| 2006/0215801 A1 | 9/2006 | Jensen | |
| 2007/0223643 A1 | 9/2007 | Yamane et al. | |
| 2010/0150296 A1 | 6/2010 | Togasawa et al. | |
| 2011/0146597 A1 | 6/2011 | DeFilippis et al. | |

FOREIGN PATENT DOCUMENTS

| | | |
|---|---|---|
| JP | 09304577 A | 11/1997 |
| JP | 2012093228 A | 5/2012 |
| WO | 2008143320 A1 | 11/2008 |

OTHER PUBLICATIONS

Unofficial English Translation of Mexican Office Action issued in connection with corresponding MX Application No. MX/a/2015/000643 dated May 11, 2016.

Unofficial English Translation of Japanese Office Action issued in connection with corresponding JP Application No. 2015002717 dated Dec. 6, 2016.

* cited by examiner

INSPECTION APPARATUS AND METHOD OF INSPECTING A REACTOR COMPONENT USING THE SAME

BACKGROUND

1. Field

The present disclosure relates to a surveying tool and a method of inspecting a nuclear reactor using the same.

2. Description of Related Art

FIG. 1 is partial, cut-away view of a reactor pressure vessel of a conventional boiling water nuclear reactor (BWR). Referring to FIG. 1, a jet pump assembly is disposed in an annular space between the reactor pressure vessel 100 and the core shroud 102. The jet pump riser pipe 104 of the jet pump assembly is secured to the inner wall of the reactor pressure vessel 100 with a jet pump riser brace 106. In particular, the jet pump riser brace 106 includes a yoke section and side members that extend from the yoke section so as to resemble a three-sided square or rectangle. The yoke section of the jet pump riser brace 106 is between the jet pump riser pipe 104 and the core shroud 102. The yoke section of the jet pump riser brace 106 is welded to the jet pump riser pipe 104. The jet pump riser pipe 104 is between the side members of the jet pump riser brace 106. The proximal ends of the side members are connected to the yoke section, while the distal ends of the side members are welded to the inner wall of the reactor pressure vessel 100.

The weld between the yoke section of the jet pump riser brace 106 and the jet pump riser pipe 104 may develop cracks over time. While efforts are made to monitor the integrity of the weld, access to the weld is relatively difficult and limited. For instance, visual inspection techniques have been used to examine the weld, but such techniques are relatively limited both in their accuracy and accessibility. These limitations have made it relatively difficult for reactor operators to fully examine and analyze the integrity of the weld. As a result, issues have arisen with regulators and reactor operations have been constrained.

BRIEF DESCRIPTION OF EXAMPLE EMBODIMENTS

A method of inspecting a reactor component in a nuclear reactor may include lowering an inspection apparatus into a reactor pressure vessel of the nuclear reactor. The inspection apparatus may include an installation platform and a scan head. The method may additionally include securing the installation platform of the inspection apparatus to a first surface of the reactor component within the reactor pressure vessel. The method may further include manipulating the scan head of the inspection apparatus around the reactor component to an opposing second surface of the reactor component.

An inspection apparatus may include an installation platform and a scan head. The installation platform may include a base frame and a longitudinal positioning rod connected within the base frame. The installation platform may have a width corresponding to an x axis, a length corresponding to a y axis, and a thickness corresponding to a z axis. The longitudinal positioning rod may extend along the y axis. The scan head may be connected to the longitudinal positioning rod of the installation platform. The scan head may be configured to move along the y axis via the longitudinal positioning rod. The scan head may include a body portion and a scan arm. The body portion may include a first end and a second end. The scan arm may include a proximal end, a distal end, and a transducer disposed on the distal end. The proximal end of the scan arm may be connected to the body portion of the scan head. The scan head may be configured to transition between a retracted state and an extended state. The transducer may be adjacent to the second end of the body portion in the retracted state and configured to travel a circumferential path so as to be adjacent to the first end of the body portion in the extended state.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
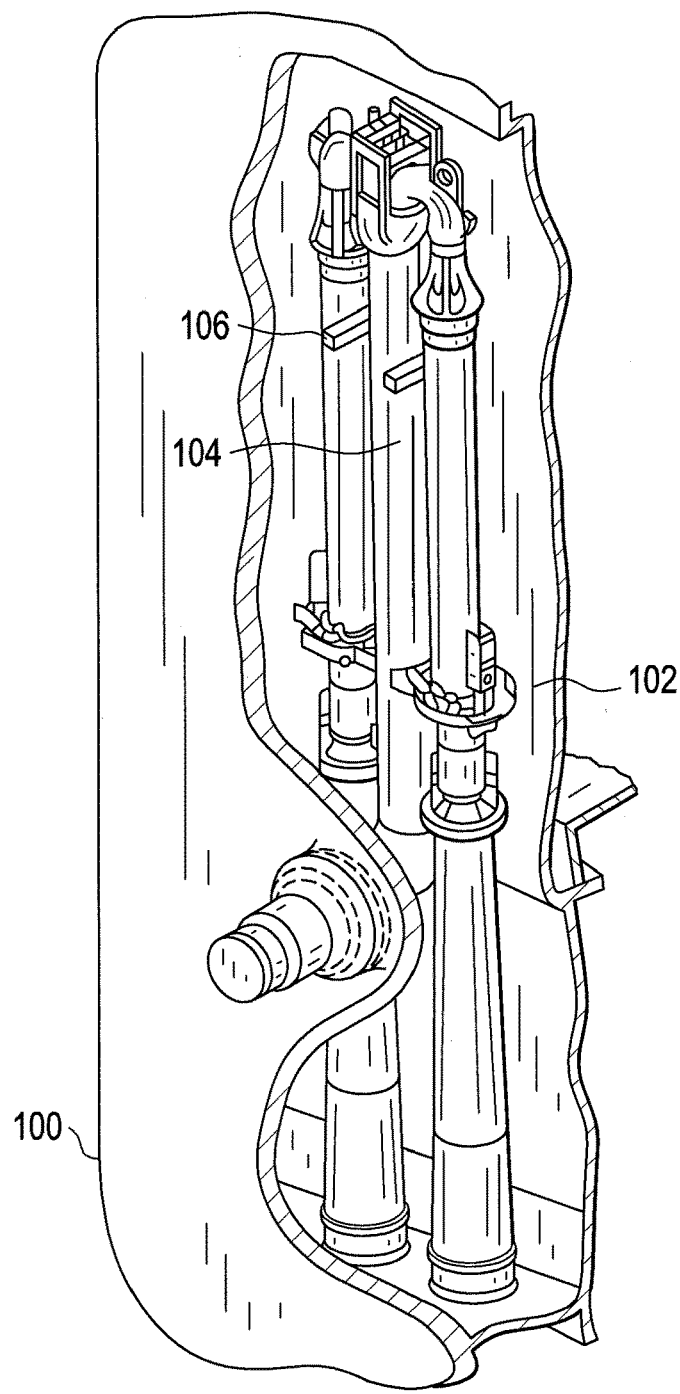
FIG. 1 is partial, cut-away view of a reactor pressure vessel of a conventional boiling water nuclear reactor (BWR).

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In one non-limiting example embodiment, the present disclosure relates to an inspection tool that is an automated, electro-mechanical manipulator capable of performing remote ultrasonic testing (UT) inspections in a nuclear reactor (e.g., testing of the RS-8 and RS-9 welds, or jet pump riser pipe to brace joints). The tool uses various motions (e.g., vertical and circumferential motions) to deliver a multi-axis matrixed phased array transducer to inspect the vertical pipe surface near the fillet welds on the top and bottom of the riser brace.

The tool includes a small submersible automated manipulator tethered to a motion controller platform and UT acquisition system. The tool may be installed into a BWR reactor pressure vessel during the inspection and temporarily mount to a jet pump riser brace to perform the desired scanning sequence.

The tool includes an installation platform and a scan head. The scanner installation platform (SIP) acts as the backbone and central core for the scanner. The SIP provides a base for the electrical junction box, the alignment and clamping mechanism, and 3 axes of motion. The SIP will also support the scan head. The scan head unit (SHU) includes a radial scan arm with the phased array transducer, and provides the circumferential motion axis.

The tool may be installed into the reactor pressure vessel via a series of small diameter handling poles. While attached to the handling pole, the tool may be navigated to the appropriate jet pump riser pipe for inspection, and manually positioned behind the jet pump riser pipe near the wall of the reactor pressure vessel. With the tool suspended vertically by the poles, the operator may set the tool down on top of the horizontal jet pump riser brace and aligned perpendicularly to the center of the reactor pressure vessel. A series of pneumatic actuations may then be used to align and clamp the tool between the jet pump riser brace, the jet pump riser pipe, and the wall of the reactor pressure vessel.

With the tool firmly clamped in place, the operator may then rotate the C-shaped scan head with a theta axis until it is aligned in front of the jet pump riser pipe and facing down. A pneumatically actuated wrist axis flips the scan head up until it is in the same horizontal plane as the jet pump riser brace, and sitting concentric with the axis of the jet pump riser pipe.

Once the scan head is aligned with the center of the jet pump riser pipe, the phased array UT probe makes contact with the surface of the jet pump riser pipe. The operator may move the vertical axis, which is integrated into the SIP backbone, until the UT probe is touching the top surface of the RS-9 weld (on the top of the jet pump riser brace). The operator may then move the circumferential axis on the scan head until the UT probe is just beyond the start of the 90 degree fillet weld that creates RS-9.

The automated scanning sequence commences once the tool setup is complete. The automated motion includes a circumferential motion around the surface of the jet pump riser pipe, from one edge of the RS-9 weld to the other side of the weld, and then a vertical motion away from the weld, followed by another circumferential motion back to the initial start point.

Once the automated scan of RS-9 weld is complete, the tool may be returned to its installed positions for the circumferential, wrist, and then theta axes. After the scan head is moved below the jet pump riser brace utilizing the vertical axis, the sequence of theta rotation, wrist flip, and automated scanning motion may be repeated in a similar fashion for the RS-8 weld (on the bottom of the jet pump riser brace).

The inspection system of the present disclosure provides BWR operators with the ability to fully characterize areas that were previously relatively inaccessible to inspections. Example embodiments of the present disclosure are discussed in further detail below in connection with the drawings.

Figure 2:
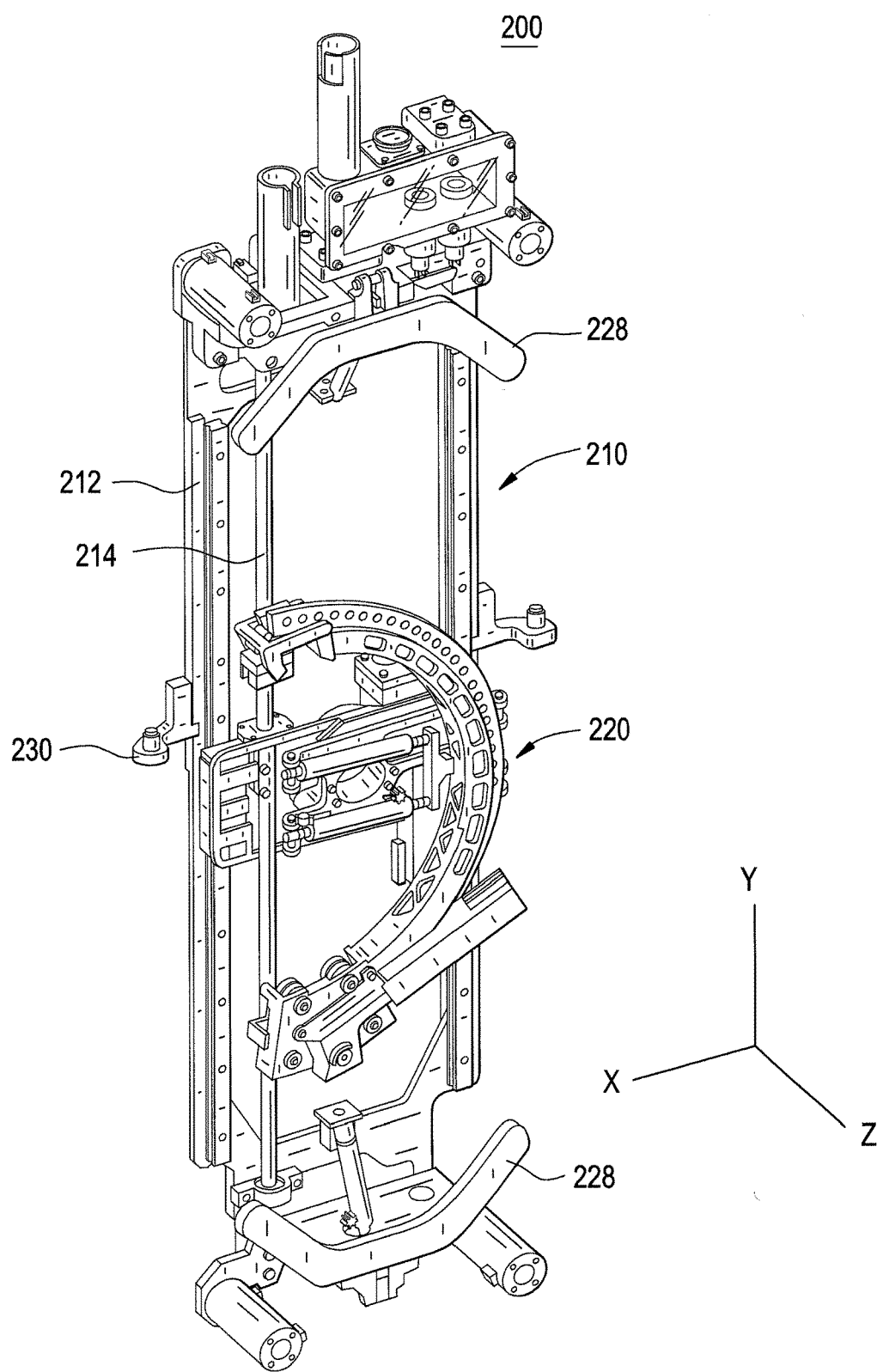
FIG. 2 is a perspective view of an inspection apparatus in a first position according to a non-limiting embodiment of the present disclosure.

FIG. 2 is a perspective view of an inspection apparatus in a first position according to a non-limiting embodiment of the present disclosure. Referring to FIG. 2, the inspection apparatus 200 includes an installation platform 210 and a scan head 220. In the first position, the scan head 220 is oriented so as to be relatively close to the installation platform 210 and also oriented so as to not protrude past the width of the installation platform 210. The first position shown in FIG. 2 is relatively compact and allows the inspection apparatus 200 to be placed into a relatively small space (e.g., between the wall of the reactor pressure vessel 100, the jet pump riser pipe 104, and the jet pump riser brace 106). Although the scan head 220 is shown in FIG. 2 as facing to the left, it should be understood that the scan head 220 can also be oriented to face to the right.

The installation platform includes a base frame 212 and a longitudinal positioning rod 214 connected within the base frame 212. The base frame 212 may have a rectangular shape. The longitudinal positioning rod 214 may be parallel to a side leg of the base frame 212. The installation platform 210 has a width corresponding to an x axis, a length corresponding to a y axis, and a thickness corresponding to a z axis. The longitudinal positioning rod 214 extends along the y axis. When in the first position, the length of the inspection apparatus 200 may be about 35 inches or less. The width of the inspection apparatus 200 in the first position may be about 15 inches or less. The thickness of the inspection apparatus 200 in the first position may be about 5 inches or less.

The scan head 220 is connected to the longitudinal positioning rod 214 of the installation platform 210. The scan head 220 is configured to move along the y axis (e.g., up, down) via the longitudinal positioning rod 214 (index movement). For example, after the inspection apparatus 200 is positioned and secured to the jet pump riser pipe 104, the scan head 220 is configured to move between the side members of the jet pump riser brace 106 in order to access the upper surface and/or lower surface thereof. The scan head 220 is also configured to rotate about the z axis so as to protrude beyond the width of the installation platform (theta movement), which will be discussed more in FIG. 3. The scan head 220 is also configured to rotate about the x axis to protrude perpendicularly from the installation platform 210 (wrist fold out movement), which will be discussed more in FIG. 4.

Figure 5:
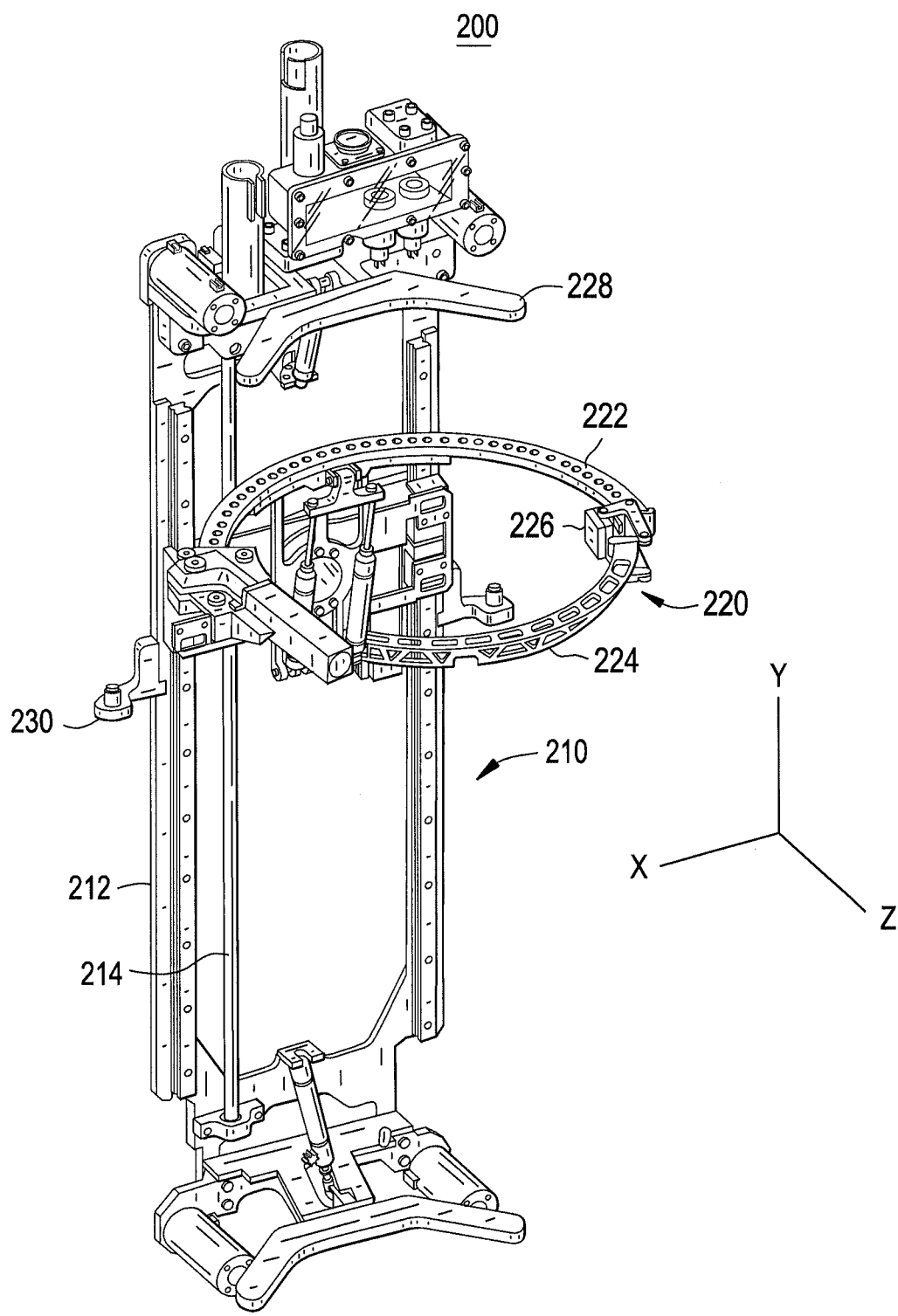
FIG. 5 is a perspective view of an inspection apparatus in a fourth position according to a non-limiting embodiment of the present disclosure.

The scan head 220 includes a body portion 222 and a scan arm 224 (FIG. 5). The body portion 222 includes a first end and a second end. The scan arm 224 includes a proximal end, a distal end, and a transducer 226 disposed on the distal end. The proximal end of the scan arm 224 is connected to the body portion 222 of the scan head 220. The scan head 220 is configured to transition between a retracted state and an extended state. The transducer 226 is adjacent to the second end of the body portion 222 in the retracted state and configured to travel a circumferential path so as to be adjacent to the first end of the body portion 222 in the extended state (scan movement). The transducer 226 is configured to perform an ultrasonic test.

In the retracted state, the proximal end and the distal end of the scan arm 224 are aligned with the first end and the second end, respectively, of the body portion 222. The body portion 222 and the scan arm 224 may have approximately the same shape and size. In FIG. 2, the scan head 220 has a semi-circular shape in the retracted state. The semi-circular shape may be designed to correspond to the curvature of the surface of the jet pump riser pipe 104.

The proximal end of the scan arm 224 is configured to move reversibly from the first end of the body portion 222 to the second end of the body portion 222. Because each of the body portion 222 and the scan arm 224 has a semi-circular shape, the scan head 220 has a circular shape (FIG. 5) in the extended state. The inner diameter of the circular shape may be designed to correspond to the outer diameter of the jet pump riser pipe 104.

The inspection apparatus 200 additionally includes end supports 228 on opposing ends of the base frame 212. In particular, one end support 228 may be disposed on the upper end of the base frame 212, while another end support 228 may be disposed on the lower end of the base frame 212. The end supports 228 may have a hybrid U-V shape, although example embodiments are not limited thereto. For instance, the end supports 228 may be designed to correspond to the curvature of the surface of the jet pump riser pipe 104. The end supports 228 are configured to rotate about the x axis so as to protrude perpendicularly from the base frame 212 in the extended state (V-block fold out movement).

The inspection apparatus 200 also includes side supports 230 protruding along the x axis from opposing sides of the base frame 212. The side supports 230 are configured to rest on the side members of the jet pump riser brace 106 during an inspection. The shape of the side supports 230 is not particularly limited and may have various forms as long as the side supports 230 are strong enough to support an entire weight of the inspection apparatus 200.

The inspection apparatus 200 may further include jacking cylinders on each corner of the base frame 212. In FIG. 2, four jacking cylinders are shown. The jacking cylinders (along with the end supports 228) may help position and secure the inspection apparatus 200 to the jet pump riser pipe 104 during the mounting step. Although the end supports 228 are shown as being between the jacking cylinders, it should be understood that, alternatively, the jacking cylinders may be arranged between the end supports 228.

When in the first position shown in FIG. 2, the inspection apparatus 200 is configured to be lowered into the reactor pressure vessel 100 with one or more handling poles. The inspection apparatus 200 may include one or more structures at the top to receive and/or engage the handling poles. When the inspection apparatus 200 is positioned in the proper location, the handling pole(s) may be withdrawn from the inspection apparatus 200. Alternatively, the handling pole(s) may remain attached to the inspection apparatus 200.

Figure 3:
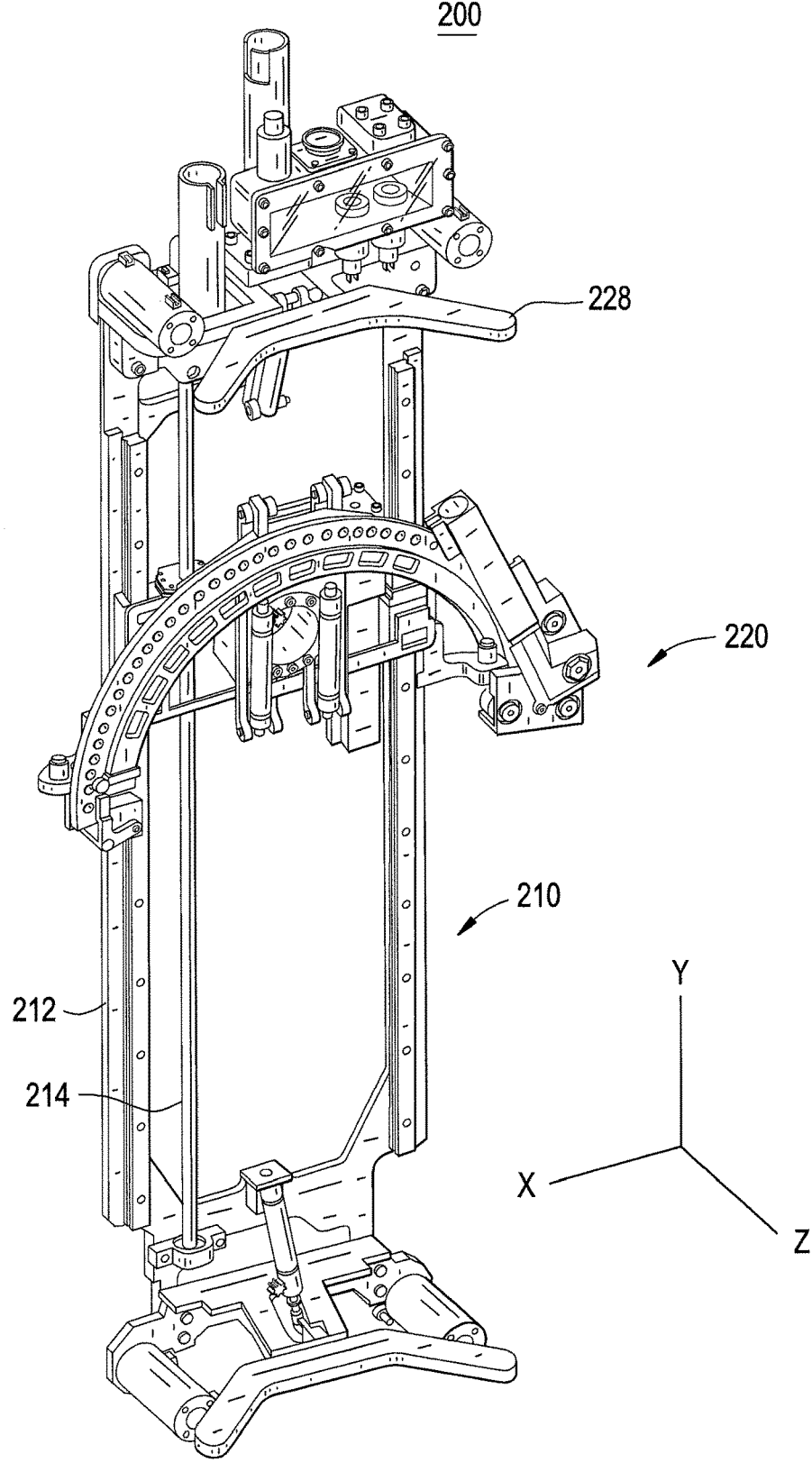
FIG. 3 is a perspective view of an inspection apparatus in a second position according to a non-limiting embodiment of the present disclosure.

FIG. 3 is a perspective view of an inspection apparatus in a second position according to a non-limiting embodiment of the present disclosure. Referring to FIG. 3, the scan head 220 has been rotated about the z axis (theta movement). Although the scan head 220 is shown in FIG. 3 as having been rotated about 90 degrees counterclockwise about the z axis so as to face downward, it should be understood that the scan head 220 may alternatively be rotated about 90 degrees clockwise so as to face upward. The end supports 228 have also been rotated about the x axis so as to protrude perpendicularly from the base frame 212 (V-block fold out movement). The jacking cylinders may also protrude outward from the base frame 212. The end supports 228 and the jacking cylinders may be actuated hydraulically and/or pneumatically.

Figure 4:
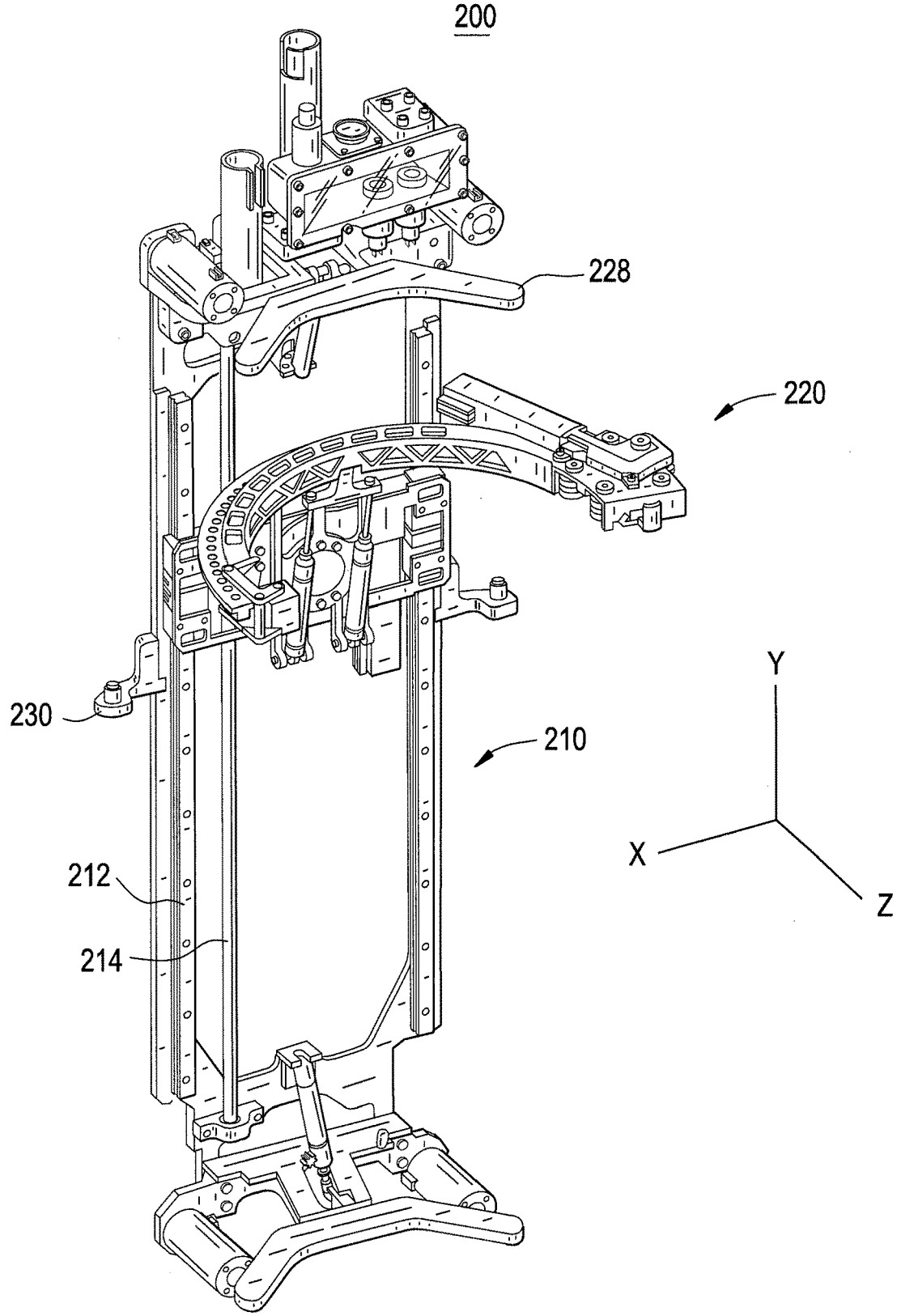
FIG. 4 is a perspective view of an inspection apparatus in a third position according to a non-limiting embodiment of the present disclosure.

FIG. 4 is a perspective view of an inspection apparatus in a third position according to a non-limiting embodiment of the present disclosure. Referring to FIG. 4, the scan head 220 has been rotated about the x axis so as to protrude perpendicularly from the installation platform 210 (wrist fold out movement). The wrist fold out movement may be actuated hydraulically and/or pneumatically. The scan head 220 may also be parallel to the end supports 228 in this third position.

FIG. 5 is a perspective view of an inspection apparatus in a fourth position according to a non-limiting embodiment of the present disclosure. Referring to FIG. 5, the scan head 220 has transitioned from a retracted state to an extended state. In particular, the scan arm 224 moves along the curvature of the body portion 222 from the first end to the second end of the body portion 222. As a result, the transducer 226 on the distal end of the scan arm 224 travels a circumferential path so as to be adjacent to the first end of the body portion 222 (scan movement).

Figure 6:
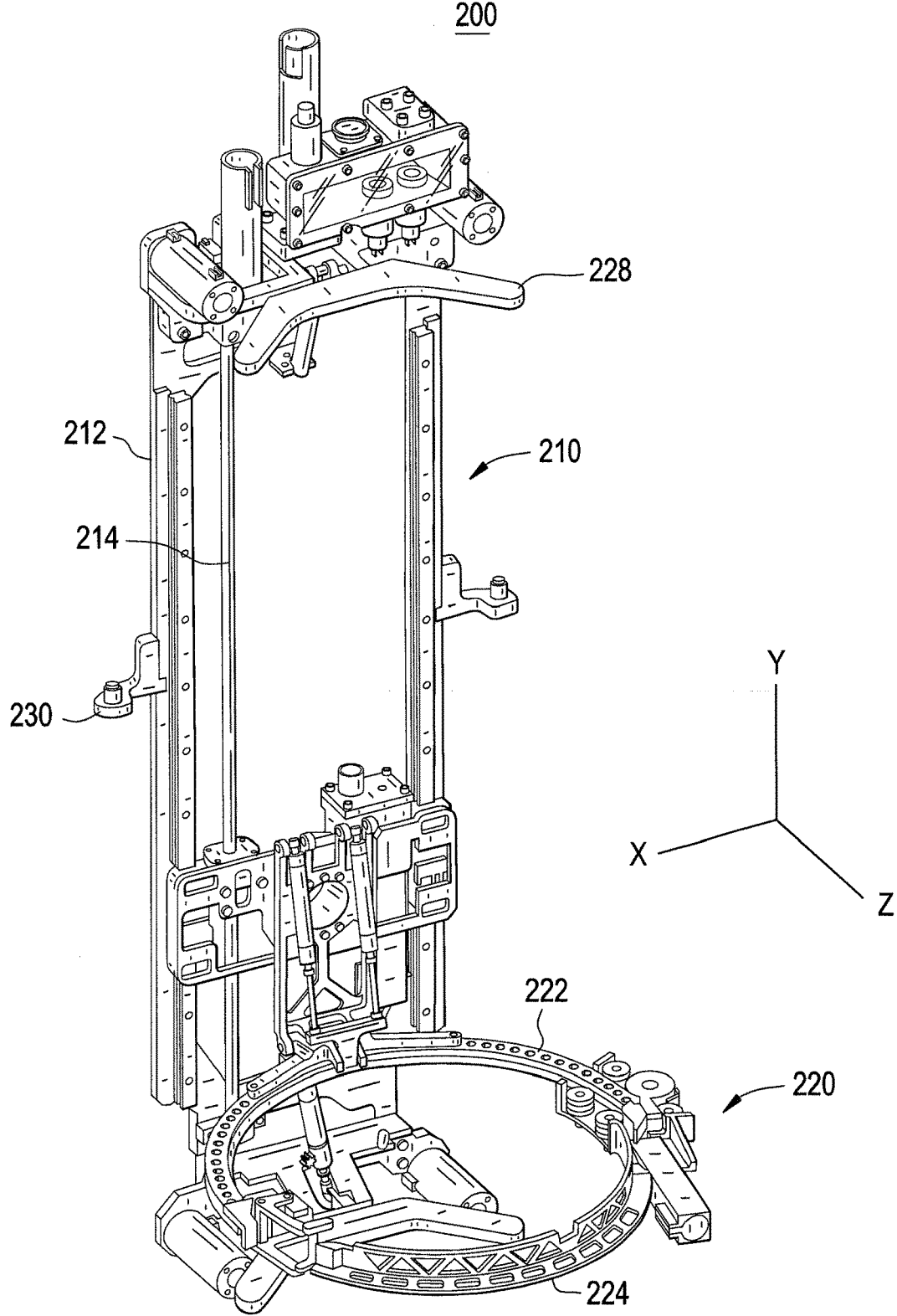
FIG. 6 is a perspective view of an inspection apparatus in a fifth position according to a non-limiting embodiment of the present disclosure.

FIG. 6 is a perspective view of an inspection apparatus in a fifth position according to a non-limiting embodiment of the present disclosure. Referring to FIG. 6, the scan head 220 has moved downward along the y axis via the longitudinal positioning rod 214 and also has been rotated 180 degrees about the z axis to allow for an inspection of an under surface of a reactor component at issue. In operation, the fourth position of FIG. 5 is reverted to the first position of FIG. 2 (via the third position of FIG. 4 and the second position of FIG. 3) before the scan head 220 is moved downward along the y axis. In particular, the first position of FIG. 2 allows the scan head 220 to pass between and below the side members of the jet pump riser brace 106 when an inspection of the understructure (e.g., RS-8 weld) thereof is desired. Once the scan head 220 is below the jet pump riser brace 106, the sequence shown in FIGS. 3-5 can be performed in reverse orientation to attain the fifth position of FIG. 6.

As noted above, the inspection apparatus 200 may be used to inspect a reactor component in a nuclear reactor. Example embodiments of the method will be discussed in further detail below. In a non-limiting embodiment, a method of inspecting a reactor component in a nuclear reactor may include lowering an inspection apparatus 200 into a reactor pressure vessel 100 of the nuclear reactor. The inspection apparatus 200 includes an installation platform 210 and a scan head 220. During the lowering step, the inspection apparatus 200 may be in the first position shown in FIG. 2. The method may additionally include securing the installation platform 210 of the inspection apparatus 200 to a first surface of the reactor component within the reactor pressure vessel 100. The method may further include manipulating the scan head 220 of the inspection apparatus 200 around the reactor component to an opposing second surface of the reactor component.

During the lowering step, the inspection apparatus 200 may be lowered into an annular space that is defined by the reactor pressure vessel 100 and a core shroud 102 that is within the reactor pressure vessel 100. A jet pump assembly may be disposed in the annular space. The inspection apparatus 200 may be disposed between the reactor pressure vessel 100 and the reactor component, which may be a jet pump riser pipe 104 of the jet pump assembly. The jet pump riser pipe 104 may be secured to the reactor pressure vessel 100 with a jet pump riser brace 106. During the securing step, the installation platform 210 of the inspection apparatus 200 may be mounted between the reactor pressure vessel 100, the jet pump riser pipe 104, and jet pump riser brace 106.

The manipulating step may include maneuvering the scan head 220 to access a junction between the jet pump riser pipe 104 and the jet pump riser brace 106. The junction may be in a form of a weld on the opposing second surface of the jet pump riser pipe 104 (wherein the installation platform 210 is on the first surface of the jet pump riser pipe 104). The weld may be a RS-8 weld and/or a RS-9 weld. As designated by BWRVIP-41, a RS-8 weld is a bottom weld that is between the bottom surface of the jet pump riser brace 106 and the jet pump riser pipe 104, while a RS-9 weld is an upper weld that is between the top surface of the jet pump riser brace 106 and the jet pump riser pipe 104.

In particular, the manipulating step may include performing a first rotation of the scan head 220 about a first axis (theta movement) and performing a second rotation of the scan head 220 about a second axis (wrist fold out movement) such that a shape of the scan head 220 corresponds to a surface of the reactor component, wherein the first axis is perpendicular to the second axis. The manipulating step may additionally include moving the scan head 220 in a circumferential path (scan movement) to the opposing second surface of the reactor component. The manipulating step may further include performing an ultrasonic test on the opposing second surface of the reactor component.

Figure 7:
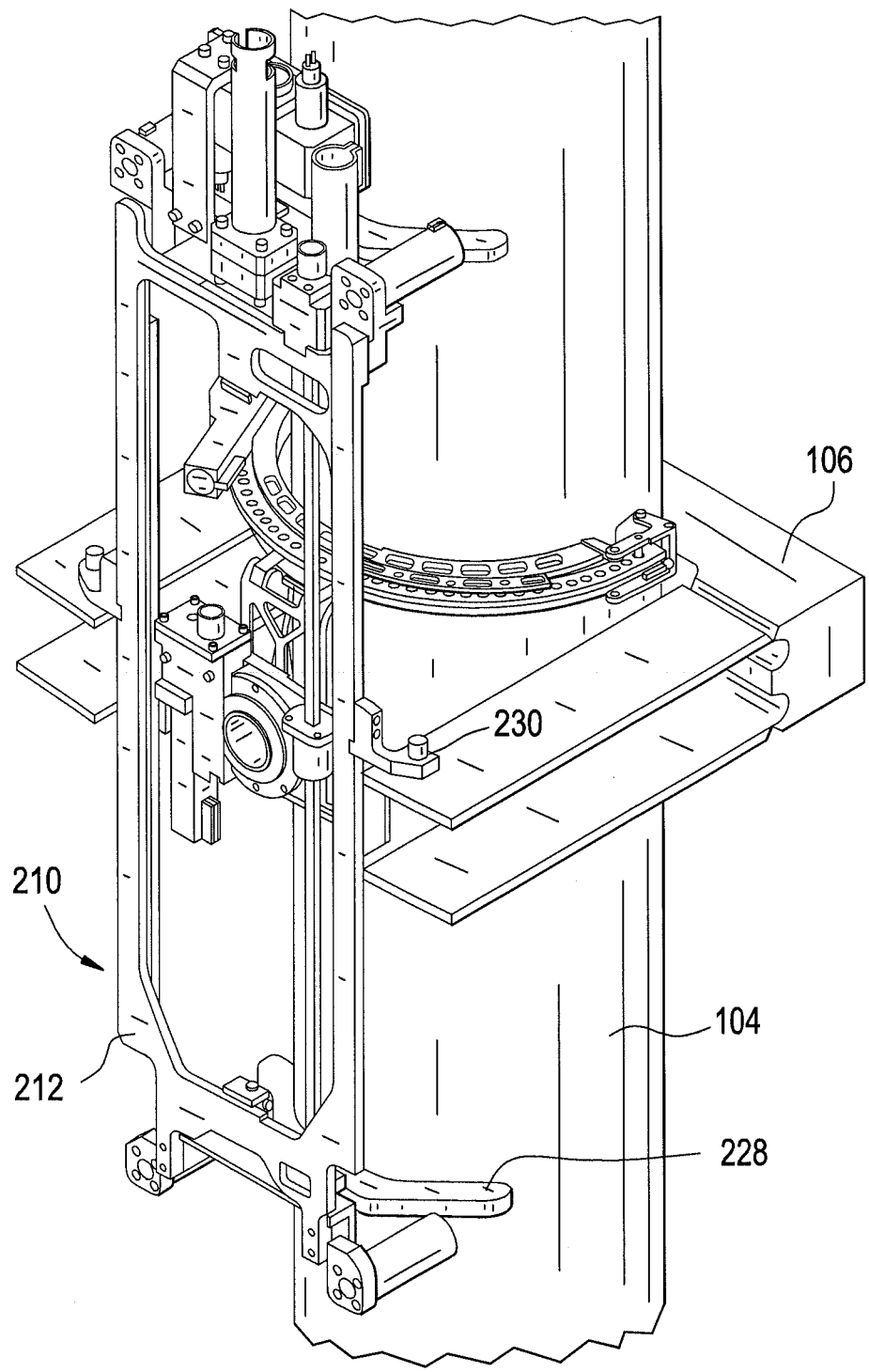
FIG. 7 is a perspective view of an inspection apparatus mounted on a jet pump riser pipe wherein the scan head is in a retracted state according to a non-limiting embodiment of the present disclosure.

FIG. 7 is a perspective view of an inspection apparatus mounted on a jet pump riser pipe wherein the scan head is in a retracted state according to a non-limiting embodiment of the present disclosure. Referring to FIG. 7, the inspection apparatus 200 is in the third position depicted by FIG. 4, although it should be understood that the inspection apparatus 200 is initially in the first position shown in FIG. 2 prior to transitioning to the second position shown in FIG. 3 and then to the third position shown in FIG. 4. The side supports 230 of the inspection apparatus 200 are disposed on the side members of the jet pump riser brace 106. The end supports 228 and the jacking cylinders are pressed against the jet pump riser pipe 104 to help position and secure the inspection apparatus 200 for operation. The scan head 220 is also positioned proximate to the first surface of the jet pump riser pipe 104.

Figure 8:
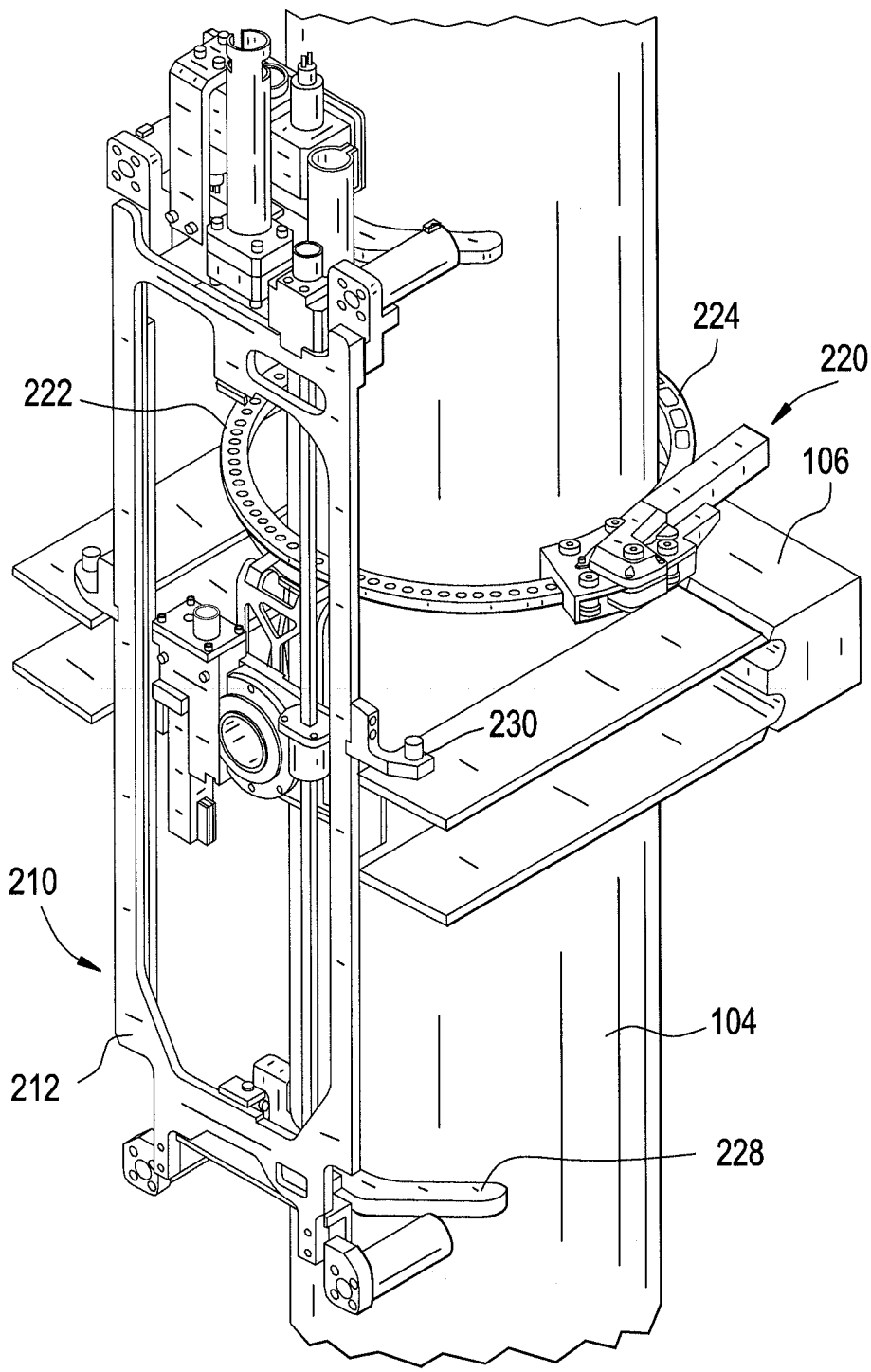
FIG. 8 is a perspective view of an inspection apparatus mounted on a jet pump riser pipe wherein the scan head is in an extended state according to a non-limiting embodiment of the present disclosure.

FIG. 8 is a perspective view of an inspection apparatus mounted on a jet pump riser pipe wherein the scan head is in an extended state according to a non-limiting embodiment of the present disclosure. Referring to FIG. 8, the inspection apparatus 200 is in the fourth position depicted by FIG. 5. In particular, the scan arm 224 with the transducer 226 has traveled a circumferential path (scan movement) so as to access the opposing second surface of the jet pump riser pipe 104.

Figure 9:
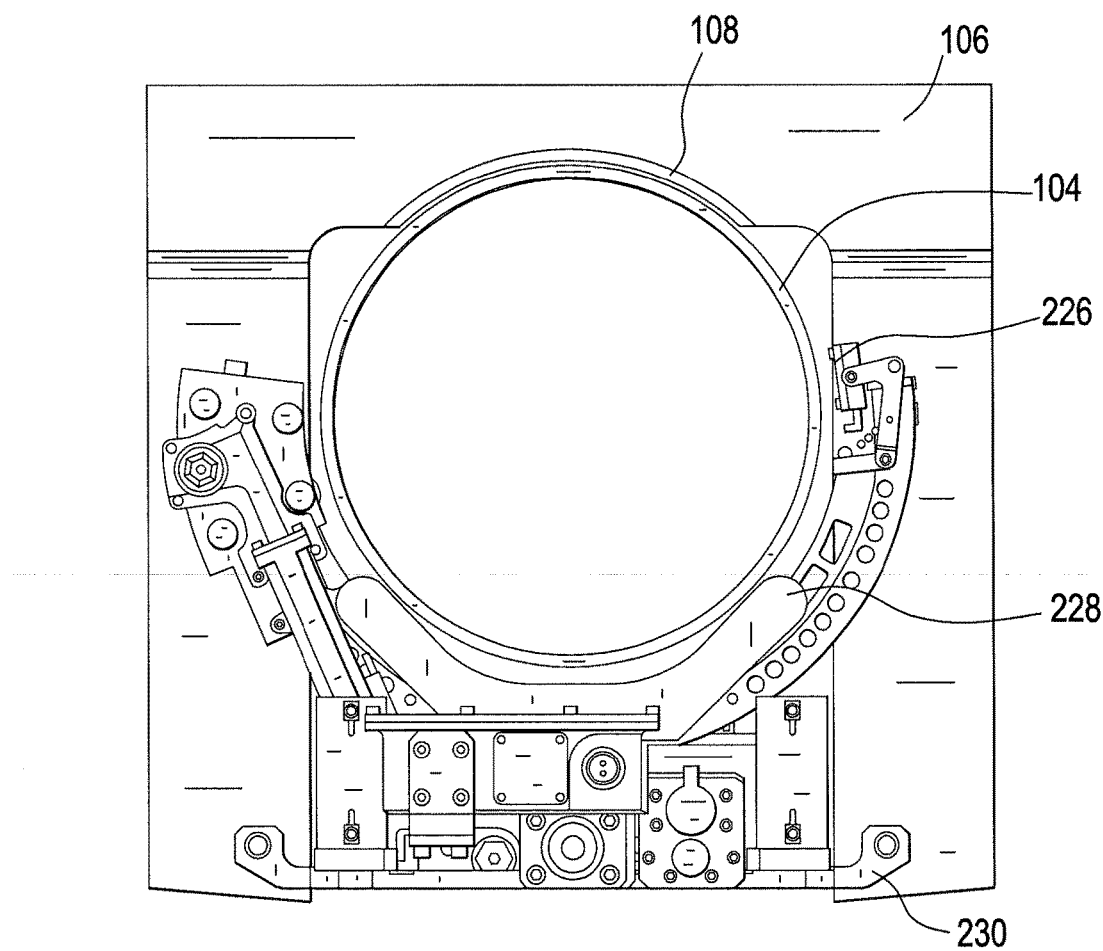
FIG. 9 is a vertical, cross-sectional view of an inspection apparatus mounted on a jet pump riser pipe wherein the scan head is in a retracted state according to a non-limiting embodiment of the present disclosure.
Figure 10:
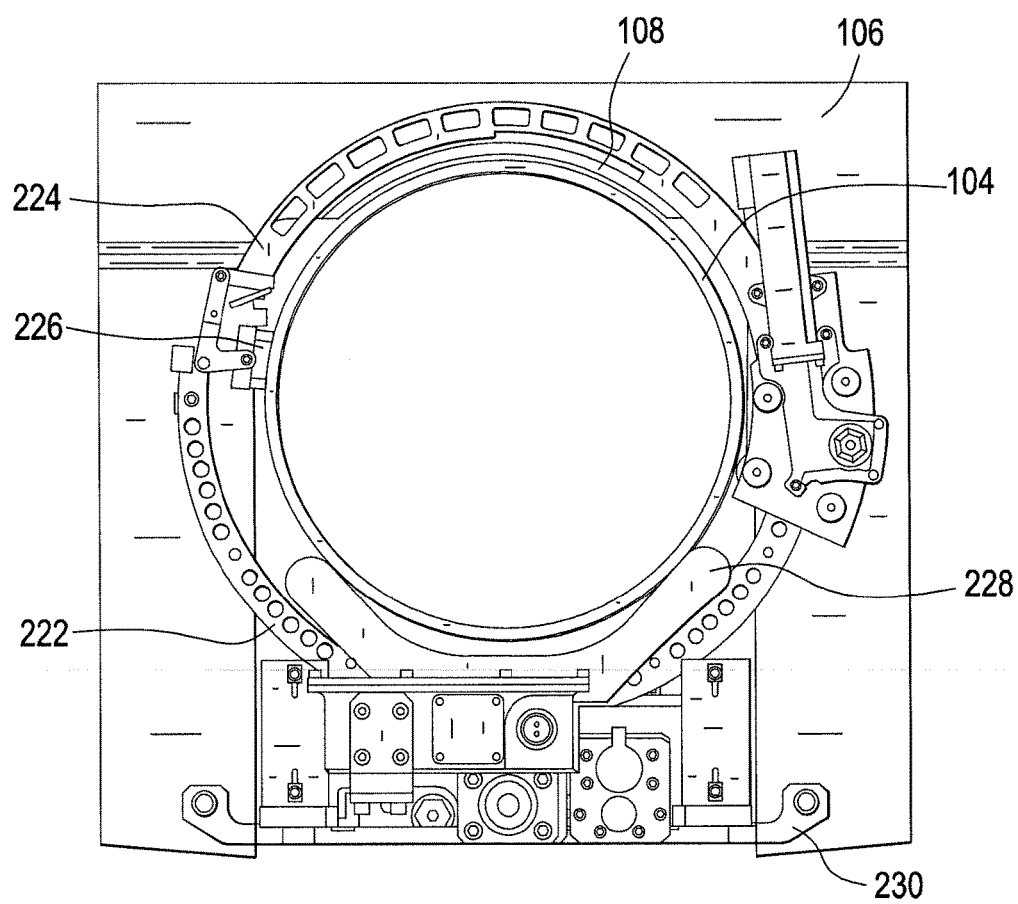
FIG. 10 is a vertical, cross-sectional view of an inspection apparatus mounted on a jet pump riser pipe wherein the scan head is in an extended state according to a non-limiting embodiment of the present disclosure.

FIG. 9 is a vertical, cross-sectional view of an inspection apparatus mounted on a jet pump riser pipe wherein the scan head is in a retracted state according to a non-limiting embodiment of the present disclosure. FIG. 10 is a vertical, cross-sectional view of an inspection apparatus mounted on a jet pump riser pipe wherein the scan head is in an extended state according to a non-limiting embodiment of the present disclosure. Referring to FIGS. 9-10, the yoke section of the jet pump riser brace 106 is secured to the jet pump riser pipe 104 via a weld 108. With the inspection apparatus 200, it is possible to access and examine the weld 108 from the opposite side of the jet pump riser pipe 104. The scan may be about a 155 degree scan of the second surface of the jet pump riser pipe 104. The transducer 226 may be configured to perform an ultrasonic test on the weld 108 (and surrounding region) to determine its integrity. After inspecting the weld 108 (e.g., RS-9 weld), the scan head 220 may be maneuvered to inspect a weld (e.g., RS-8 weld) on the opposite surface of the jet pump riser brace 106 without having to reposition the inspection apparatus 200.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of inspecting a reactor component in a nuclear reactor, comprising:
   lowering an inspection apparatus into a reactor pressure vessel of the nuclear reactor, the inspection apparatus including an installation platform and a scan head;
   securing the installation platform of the inspection apparatus to a first surface of the reactor component within the reactor pressure vessel; and
   manipulating the scan head of the inspection apparatus to extend to wrap around the reactor component to an opposing second surface of the reactor component such that the installation platform remains stationary when the scan head is extended to wrap around the reactor component.

2. The method of claim 1, wherein the lowering includes disposing the inspection apparatus in an annular space, the annular space defined by the reactor pressure vessel and a core shroud.

3. The method of claim 1, wherein the lowering includes disposing the inspection apparatus between the reactor pressure vessel and the reactor component, the reactor component being a jet pump riser pipe.

4. The method of claim 3, wherein the jet pump riser pipe is secured to the reactor pressure vessel with a jet pump riser brace.

5. The method of claim 4, wherein the securing includes mounting the installation platform of the inspection apparatus between the reactor pressure vessel, the jet pump riser pipe, and jet pump riser brace.

6. The method of claim 4, wherein the manipulating includes maneuvering the scan head to access a junction between the jet pump riser pipe and the jet pump riser brace, the junction being in a form of a weld on the opposing second surface.

7. The method of claim 6, wherein the weld is at least one of a RS-8 weld and a RS-9 weld.

8. The method of claim 1, wherein the manipulating includes performing a first rotation of the scan head about a first axis and performing a second rotation of the scan head about a second axis such that a path of the scan head corresponds to a surface of the reactor component, the first axis being perpendicular to the second axis.

9. The method of claim 1, wherein the manipulating includes moving the scan head in a circumferential path to the opposing second surface of the reactor component.

10. The method of claim 1, wherein the manipulating includes performing an ultrasonic test on the opposing second surface of the reactor component.

11. The method of claim 1, wherein the manipulating includes encircling the reactor component with the scan head.

12. The method of claim 1, wherein the manipulating includes transitioning the scan head from a retracted state and an extended state, the scan head having a semi-circular shape in the retracted state and a circular shape in the extended state.

* * * * *